United States Patent [19]

Montgomery

[11] 3,957,616

[45] May 18, 1976

[54] REFLEX REFLECTOR

[75] Inventor: James R. Montgomery, Anderson, Ind.

[73] Assignee: General Motors Corporation, Detroit, Mich.

[22] Filed: Oct. 10, 1974

[21] Appl. No.: 513,697

Related U.S. Application Data

[62] Division of Ser. No. 400,241, Sept. 24, 1973, Pat. No. 3,851,947.

[52] U.S. Cl. ................................... 204/281; 264/1
[51] Int. Cl.² ...................... C25D 1/00; B29D 11/00
[58] Field of Search ................ 204/281, 7; 264/1; 350/102, 103

[56] References Cited
UNITED STATES PATENTS

| | | | |
|---|---|---|---|
| 2,055,298 | 9/1936 | Leray | 350/103 |
| 2,723,595 | 11/1955 | Rupert | 350/103 |
| 3,258,840 | 7/1966 | Hedgewick et al. | 350/103 |
| 3,450,459 | 6/1969 | Haggerty | 350/103 |
| 3,548,041 | 12/1970 | Steding | 204/4 |
| 3,632,695 | 1/1972 | Howell | 264/1 |
| 3,810,804 | 5/1974 | Rowland | 264/1 |

*Primary Examiner*—T. M. Tufariello
*Attorney, Agent, or Firm*—J. C. Evans

[57] ABSTRACT

A reflex reflector for retrodirecting illumination from the lamps of an approaching motor vehicle includes an array of interfitting V-block shaped cube corners having three mutually perpendicular reflecting faces within a frontal rectangular boundary. Each cube corner includes a first face bounded by a short side of the rectangle and the diagonals therefrom, a second face bounded by a long side and the diagonals therefrom including the diagonal common with the first face, and a third face bounded by the opposite short side and the diagonals therefrom including the diagonal common with the second face. In the array, the faces mate with the corresponding faces of juxtaposed adjacent cube corners to form a rectangular reflex strip. The reflector, when positioned vertically, redirects the intercepted illumination upwardly to the driver of the approaching vehicle.

2 Claims, 10 Drawing Figures

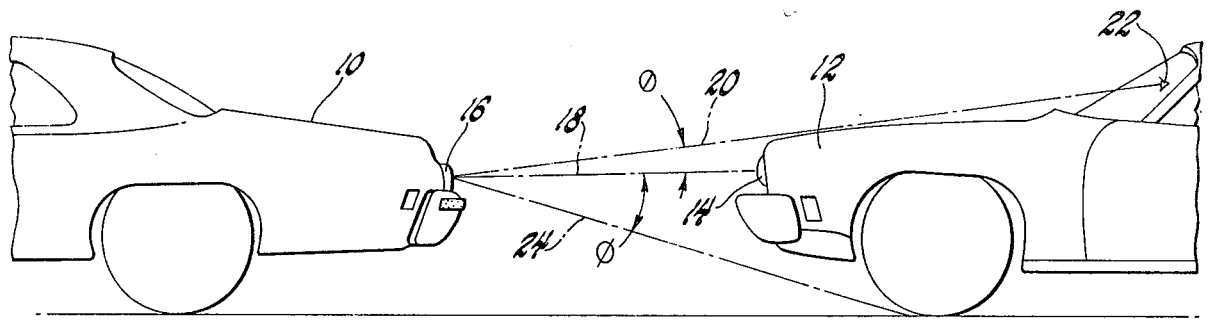
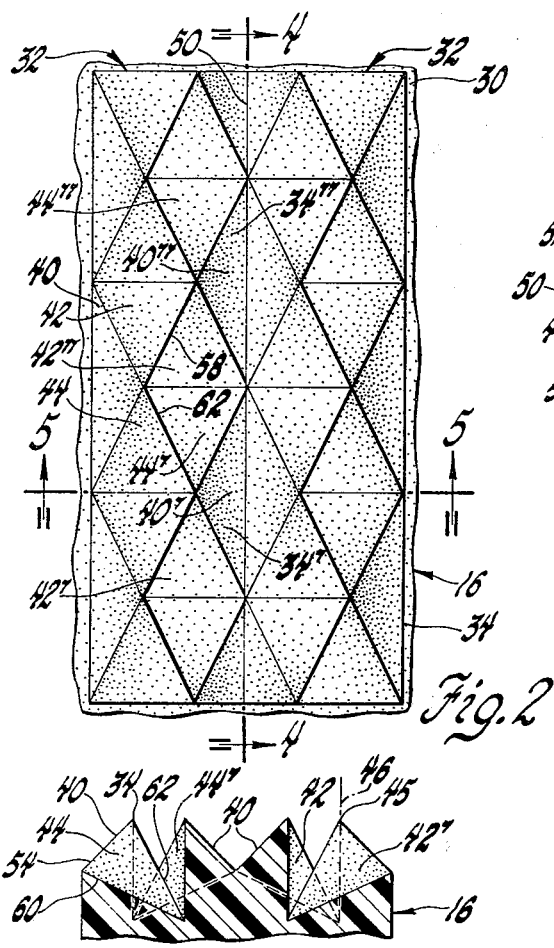
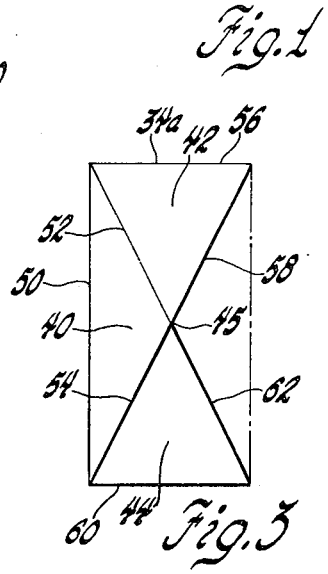
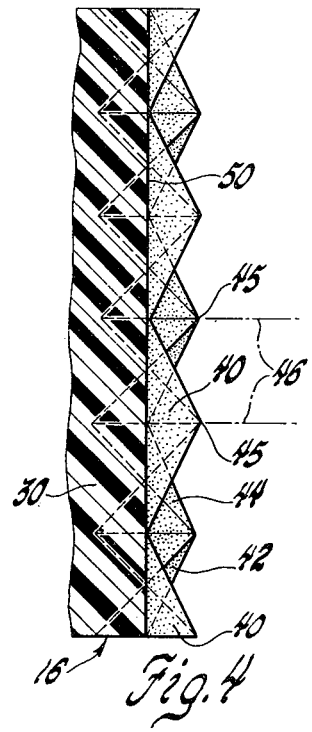
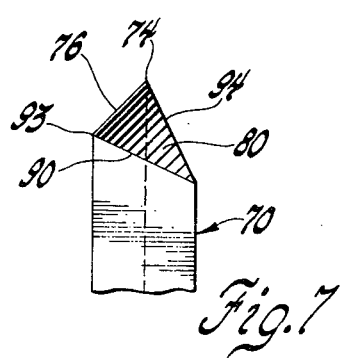
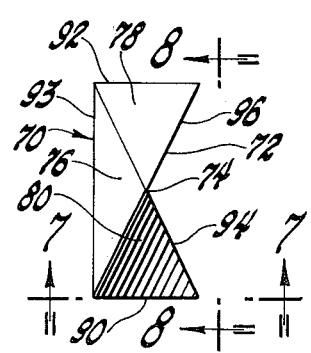

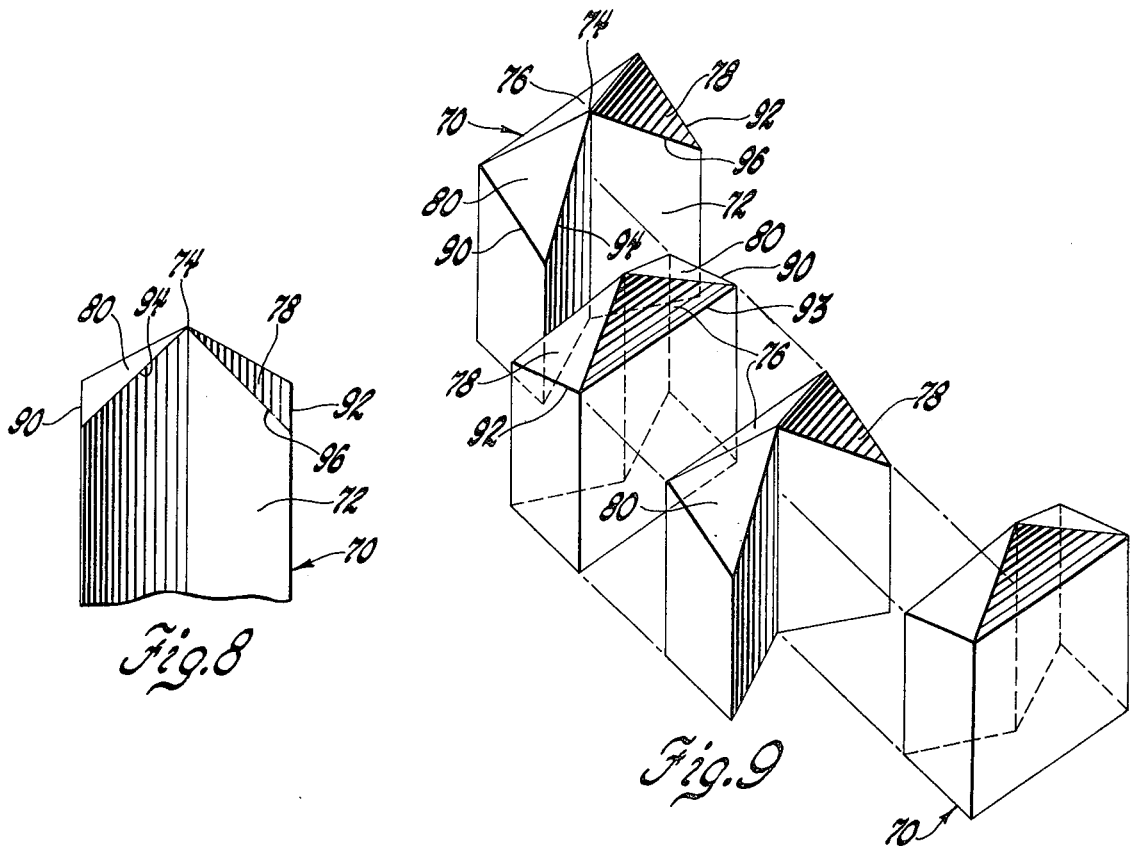
Fig.8
Fig.9
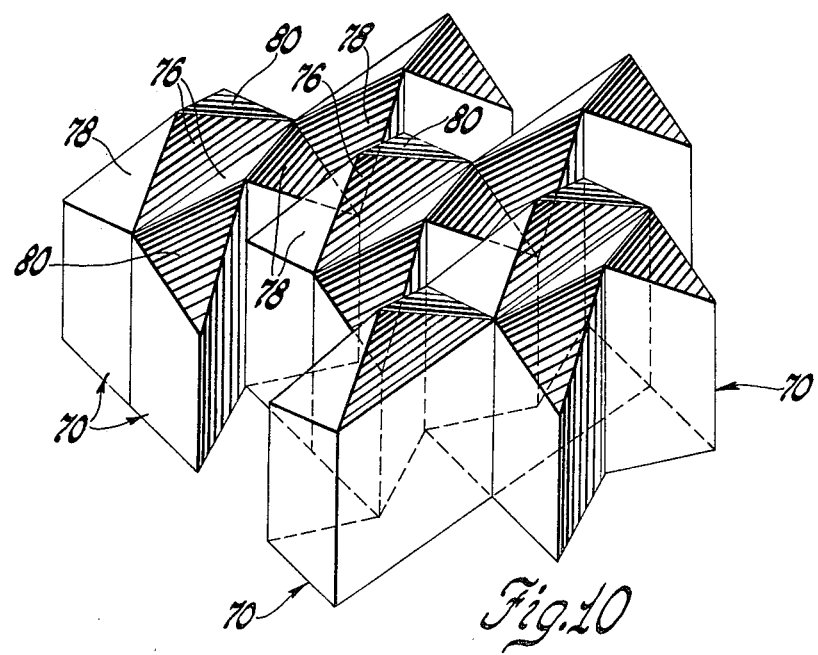
Fig.10

REFLEX REFLECTOR

This is a division of Ser. No. 400,241, filed Sept. 24, 1973, now U.S. Pat. No. 3,851,947 issued Dec. 3, 1974.

The present invention relates to reflex reflectors, and in particular, to a reflex reflector for a motor vehicle having a cube corner array producable in strip form and having a substantially unidirectional response to intercepted illumination.

Reflex reflectors currently used on motor vehicles for reflecting light from an approaching vehicle back to the driver thereof employ an array of hexagonal shape reflex cube corners. Each cube corner is in the form of a trihedron three mutually perpendicular reflecting faces. Such a cube corner returns the incident light to six sectors about its axis. Thus, the reflex area functions to redirect light to areas not visible by the approaching driver. However, inasmuch as current motor vehicle regulations only require that the incident light be returned upwardly to the driver, the portions of the reflex cube corners contributing to the non-visible reduction are superfluous and not necessary for satisfying the lighting standards.

The present invention provides a reflex reflector having minimal cube corner area for redirecting light within the desired upward viewing sector. The areas providing sideward response are eliminated and the cube area is confined to those portions essential for providing upward response. More particularly, the rear surface at the reflector is comprised of a plurality of interfitting V-block shaped cube corners. Each cube corner is located within a V-grooved rectangular boundary. The cube corner has a side face bounded by the long side of rectangle and the diagonals therefrom intersecting at the cube corner central axis, and upper and lower faces symmetrically disposed with respect to the side face and bounded by the short sides of the rectangle and the diagonals extending therefrom and intersecting at the axis. In the cube corner array, the faces mate with the corresponding faces of adjacent juxtaposed cube corners. Two adjacent rows form a rectangular strip.

The pins for forming the cube corners are also disclosed. The pins are generally rectangular bodies having a longitudinal V-groove formed therein. The sides of the groove extend outwardly from a centroidal axis along the diagonals intersecting the opposed short side walls. The pin elements are interfitted in an array corresponding to the desired cube corner cluster to form a rectangular strip. An electroform is made of the pin by conventional processes. The resulting electroform strip is cut to form desired reflex area for ultimate use in the reflector mold cavity.

The reflex reflector then functions to return light vertically with respect to the axis of the cube corner. The intercepted light from a following vehicle thus impinge upon one of the lower faces and internally reflected onto the side face and upwardly therefrom to the upper face for redirection to the driver.

These and other features of the present invention will be apparent to those skilled in the art upon reading the following detailed description, reference being made to the accompanying drawings illustrating a preferred embodiment in which:

FIG. 1 is a side elevational view of two motor vehicles illustrating the light return path from the headlamps of an approaching motor vehicle as provided by the reflex reflector made in accordance with the present invention mounted on the leading vehicle;

FIG. 2 is a rear view of the reflex reflector illustrating the vertical strips of interfitting cube corners;

FIG. 3 is an enlarged rear view of an isolated cube corner;

FIG. 4 is a view taken along line 4—4 of FIG. 2;

FIG. 5 is a view taken along line 5—5 of FIG. 2;

FIG. 6 is a front view of a reflex pin used in forming the cube corners of FIG. 2;

FIG. 7 is a side view of the reflex pin taken along line 7—7 of FIG. 6;

FIG. 8 is a side view of the reflex pin taken along line 8—8 of FIG. 6;

FIG. 9 is an exploded perspective view showing a plurality of reflex pins aligned in spaced relationship; and FIG. 10 is a perspective view of the pins of FIG. 9 interfitted to establish the array used in forming the cube corners of FIG. 2.

Referring to FIG. 1, there is shown a leading motor vehicle 10 and an approaching or trailing motor vehicle 12. Light from the headlamps 14 of the trailing motor vehicle 12 horizontally impinge upon a reflex reflector mounted on the rear of the vehicle 10 along ray 18. The light is upwardly retrodirected from the reflector 16 along ray 20 to the driver 22 of the motor vehicle 12.

Reflex reflectors as used herein refer to devices which are used on motor vehicles to give an indication to an approaching driver by reflected light from the lamps on the approaching vehicle. They are generally designed to be visible at night within a specified range, particularly when illuminated by the lower beam of the headlamps.

Certain angular relationships are used in prescribing the performance of reflex reflectors. The angle $\theta$ (theta) between the driver 22 along ray 20 and a horizontal ray 18 between the headlamps 14 and the center of the reflex reflector 16 is known as the "observation angle". The angle $\phi$ (phi) between the ray 18 and the optical axis 24 of the reflector 16 is designated the "entrance" angle. The current Federal Motor Vehicle Safety Standards require that, for particular observation angles generally 0.2° up and 1.5° up, certain minimum candlepower per incident foot-candle of illumination be reflected at prescribed entrance angles.

In conventional three corner reflector cubes, it is known that a single incident beam of light is broken into six distinct illumination sectors. The sectors occur at about 0.2° of the center axis of the cube. For conventional cube orientation the sectors are located above, below, left and right of the cube axis. Thus, only a portion of the cube corner faces are used in the actual return of the requisite "up" illumination. A reflex reflector made in accordance with the present invention, on the other hand utilizes only those areas of the cube corner reflecting faces which are necessary for returning this requisite up illumination.

More particularly and referring to FIG. 2, the reflex reflector 16 comprises a molded plastic body 30 including a pair of rectangular reflex areas 32 molded on its rear surface. Each of the reflex areas 32 is comprised of an array of interfitting V-block shaped cube corners typically indicated by the numeral 34.

For purposes of description, an isolated cube corner 34a is shown in FIG. 3. The cube corner 34 is located within a generally rectangular boundary and comprises a side face 40, an upper face 42, and a lower face 44.

The three faces 40, 42 and 44 form a trihedron wherein the faces are mutually perpendicular. The faces have an apex 45 at the cube axis 46. The axis 46 may bear various angular relationships to the normal to the front face of the reflector to return incident light in the desired up direction.

The side face 40 is bounded by a vertical edge 50 and diagonals 52 and 54 extending from the ends thereof intersecting at the axis 46. The upper face 42 is bounded by the upper short edge 56 of the rectangle and the diagonals 52 and 58 extending from the ends thereof and intersecting at the axis 46. Diagonal 58 is a continuation of diagonal 54. The diagonal 52 constitutes an edge common to the faces 40 and 42. The lower face 44 is symmetrically disposed about the side face 40 with respect to the upper face 42. The lower face 44 is bounded by the lower short edge 60 and the diagonals 54 and 62 extending from the ends thereof and intersecting the axis 46. The diagonal edge 54 is common with the side face 40 and the lower face 44. The periphery of the cube corner 34 is thus defined by the edges 60, 50, 56 and the V-shaped diagonal edges 58 and 62.

When mounted on a vehicle, light impinging upon reflector 16 from an approaching vehicle will be refracted at the front surface thereof and impinge upon face 44. It will be totally internally reflected therefrom onto the side face 40 and reflected therefrom to the face 42 for upward reflection and refraction along ray 20 to the driver 22. The reverse routing along faces 42, 40, 44 also occurs.

Each cube corner thus individually reflects illumination from the trailing vehicle upwardly within the prescribed observation angle. The requisite candlepower per incident foot candle of illumination is established by providing an array of cube corners having sufficient reflecting area to meet the requirements. This is achieved in the present design by interfitting an array of cube corners 34 which have sufficient area to provide the desired reflectivity. For purposes of illustration, starting at the left-hand edge of FIG. 2, a vertical row of three cube corners is shown. Each corner includes faces 44, 40 and 42. The corresponding faces of juxtaposed adjacent cubes 34' and 34" mate with the corresponding faces of the adjacent cube corners. A cube corner is provided at the upper and lower right-hand boundaries. The sequence is repeated vertically along the area 32. With regard to an adjacent reflex area, the side faces 40 mate, although this is not necessary inasmuch as the areas are independent. The faces 40 thus define the vertical edges of the reflex area 32. When positioned adjacent the similar reflex area, the desired reflex area is formed.

The reflex areas are formed by an electroform mold insert. The insert has recesses corresponding to the individual cube corners. The insert is made by conventionally electroforming the faces of pins hereinafter described, cutting the electroform to a desired length and inserting it in the mold cavity. The molded article accordingly will have cube corners conforming to the faces to these pins.

The pins for forming the aforementioned reflex reflector cube corners are shown in FIGS. 6 through 10. The individual pins 70 in front view are identical to the aforementioned cube corners 34. However, each is formed from generally rectangular stock and has a longitudinal V-shaped groove 72 formed coincident with the diagonals extending from the long side of the rectangular body and intersecting at the apex or centroidal axis 74. The pin has a side face 76 corresponding to the side face 40 of the cube corner, an upper face 78 corresponding to the upper face 42 of the cube corner, and a lower face 80 corresponding to the lower face 44 of the cube corner 34. The three faces 76, 78 and 80 are mutually perpendicular about the axis 74. The pin element 70 thus has a lower sidewall 90, an upper sidewall 92 and a vertical sidewall 93. The groove is formed by intersecting sidewalls 94 and 96. As shown in FIG. 9, the generally V-block shaped bodies are adapted to interfit. The sidewall 94 mates with a juxtaposed adjacent sidewall 94 of an identical pin element. Correspondingly, the wall 96 mates with an identical wall of an adjacent juxtaposed pin element. The walls 90 similarly mate with adjacent elements.

As previously mentioned, by a suitable conventional electroform process, a mold insert is established having trihedral recesses in the form of the mutually perpendicular faces of the individual pins. When this electroform is cut to the desired length and width and inserted in the mold cavity, the molded article will thus have the aforementioned cube corners 34, each of which corresponds to the mutually perpendicular faces of an individual pin.

Each cube corner will optically perform as above recited wherein illumination from the headlamps 14 impinging upon the lower face 44 will be internally reflected onto the side face 40 and therefrom onto the upper face 42 for redirection along ray 20 to the driver of the vehicle. By eliminating extraneous left and right response and the reflecting areas therefor, the overall reflex area required for providing the desired upward response is reduced and reflexing efficiency maximized.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A cube corner reflex pin comprising: a rectangular body having a long side, and a pair of parallel short walls, said body further including a longitudinal V-shaped groove having diagonal walls formed therein extending outwardly from its centroidal axis, three mutually perpendicular faces formed at one end of said body and intersecting at said centroidal axis, one of said faces having diagonal edges and being oppositely disposed from said V-shaped groove and being defined by an area bounded by the long side and said diagonal edges extending between the axis and the ends of said long side, the other faces being symmetrically disposed with respect to the groove and said one of said faces, said other faces being defined by the areas bounded by the short sides, said diagonal edges and said diagonal walls extending between the axis and intersecting the ends of the short sides.

2. An array of cube corner reflex pins comprising: a plurality of interfitting V-block pin elements, each element comprising a rectangular body having a long wall, opposed short walls and a longitudinal V-shaped groove having diagonal walls formed therein extending outwardly from its centroidal axis, said long side wall, opposed short side walls, and diagonal walls all being parallel to said centroidal axis, three mutually perpendicular faces formed at one end of said bodies and mutually intersecting at an apex at said centroidal axis, one of said faces having diagonal edges and being oppositely disposed from said V-shaped groove and being defined by the area bounded by the long side and said diagonal edges intersecting the ends thereof, the other faces being symmetrically disposed with respect to the groove and said one face and being defined by the areas bounded by the short sides, said diagonal edges and said diagonal walls intersecting the ends of the short sides, said bodies being interfitted with the companion diagonal side walls of adjacent walls in abutting juxtaposed relationship such that an array of said elements establishes a reflex strip with said long side walls forming the outside walls thereof.

* * * * *